March 12, 1929. A. SAVOY 1,705,314
LOCKING DEVICE FOR MOTOR VEHICLES
Filed July 28, 1926. 2 Sheets-Sheet 2
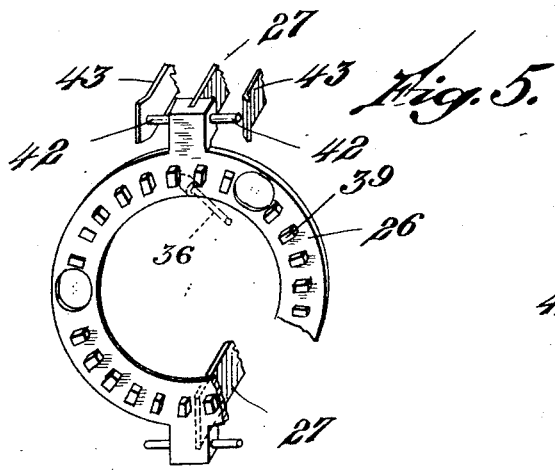
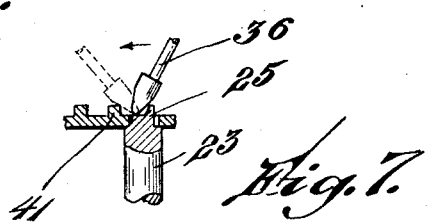
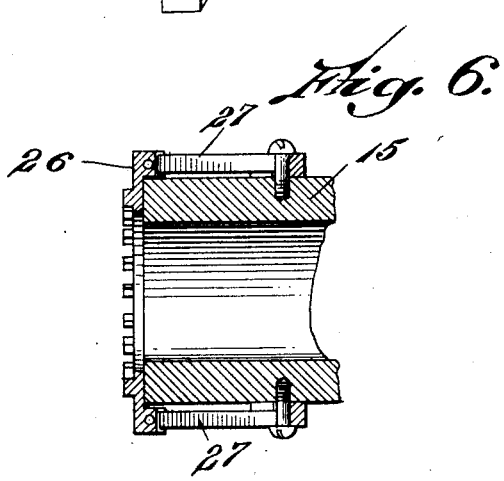
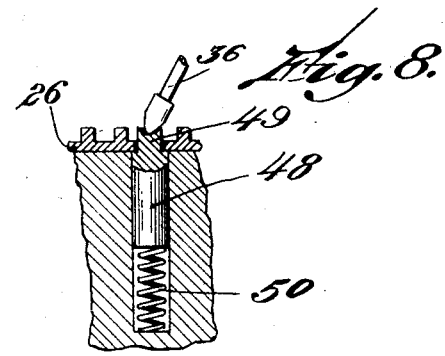
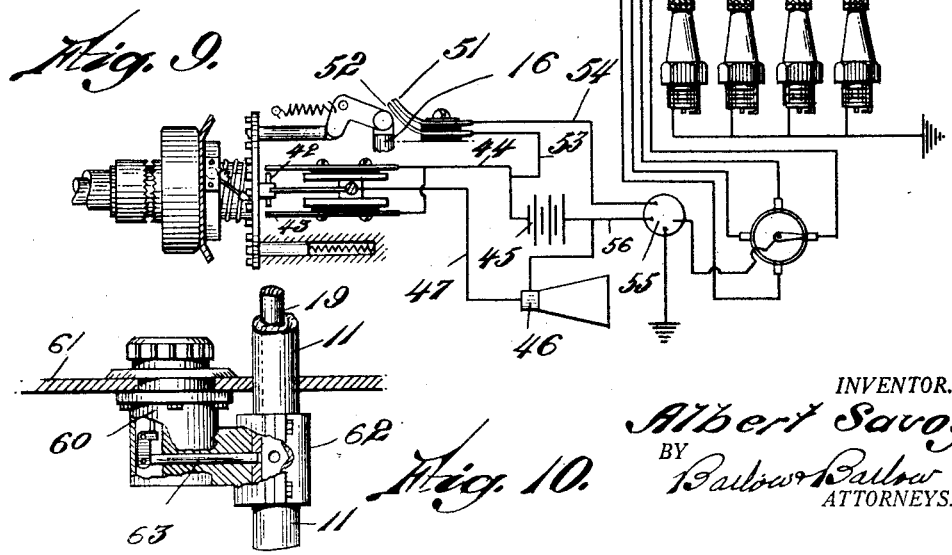
INVENTOR.
Albert Savoy
BY Barlow & Barlow
ATTORNEYS.

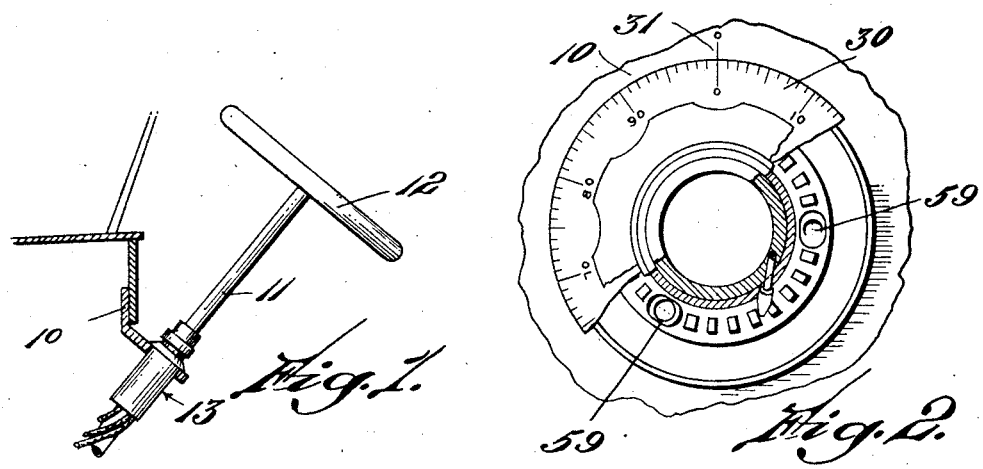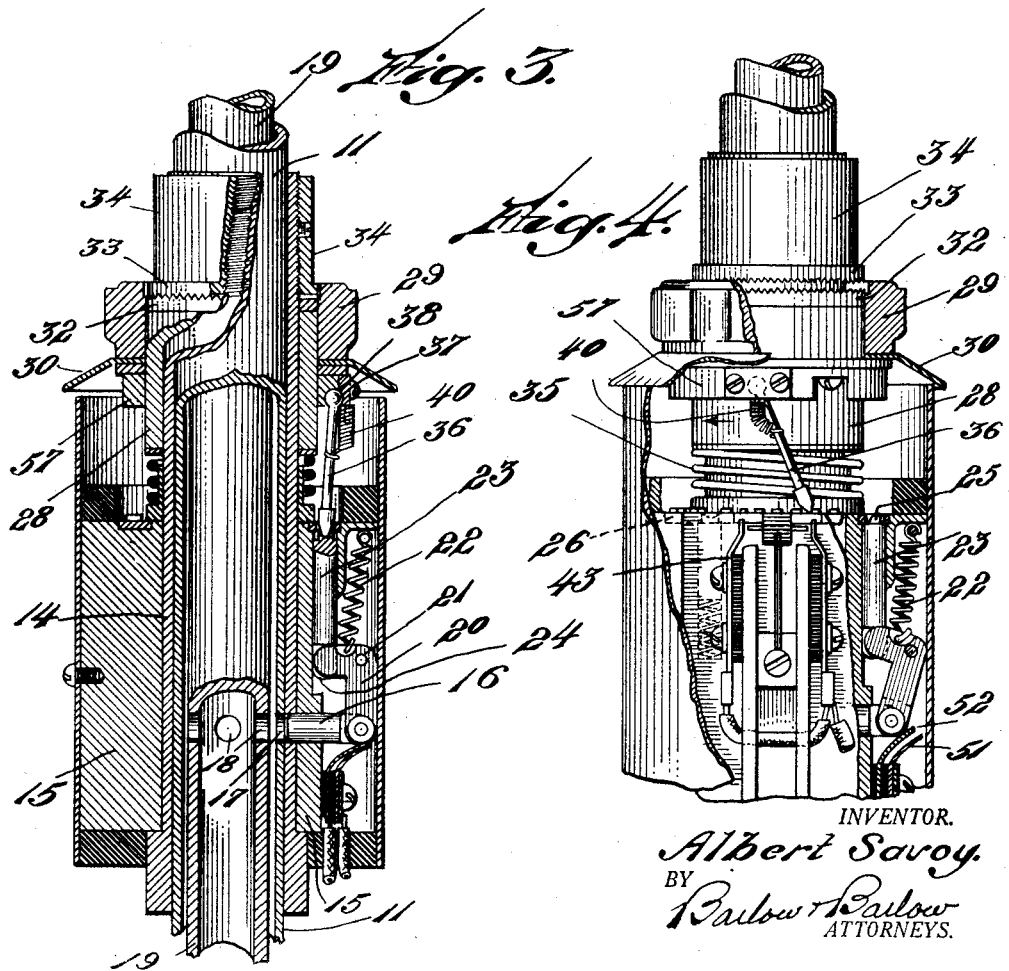

Patented Mar. 12, 1929.

1,705,314

UNITED STATES PATENT OFFICE.

ALBERT SAVOY, OF NORTH ATTLEBORO, MASSACHUSETTS.

LOCKING DEVICE FOR MOTOR VEHICLES.

Application filed July 28, 1926. Serial No. 125,405.

This invention relates to a locking device for motor vehicles more particularly automobiles; and has for its object to provide a lock for the steering device of a motor vehicle in which no keys are used to operate the same but which is operable by the setting of an operating member to a combination of predetermined positions.

A further object of the invention is to lock the ignition of the motor vehicle simultaneously with the locking of the steering mechanism.

A still further object of the invention is to provide means for sounding the horn or audible signal of the motor vehicle when an attempt to unlock the same is made by one who is not acquainted with the predetermined positions to which the operating member must be moved to accomplish the desired unlocking movement.

With these and other objects in view the invention consists of certain novel features of construction, as will be more fully described, and particularly pointed out in the appended claims.

In the accompanying drawings:

Figure 1 is a fragmental side elevation of the steering column of a motor vehicle with my improved locking device mounted thereon.

Figure 2 is an elevation partly in section of the improved locking device.

Figure 3 is a side elevation of the locking device.

Figure 4 is a side elevation at right angles to that shown in Figure 3, with the outer casing broken away to expose certain of the operating parts.

Figure 5 is a perspective view of the disc rack member.

Figure 6 is a side elevation showing the mounting of the rack member on the body of the device.

Figure 7 is a fragmental detail partially in section of the dog and plunger showing their relation to the rack.

Figure 8 is a fragmental detail of the dog and auxiliary plunger showing its relation to the rack and body of the device.

Figure 9 is a diagrammatic view illustrating the relation of this locking device to the electric circuit of a motor vehicle.

Figure 10 is a view partly in section showing the lock set to one side of the steering post to throw its bolt to lock this post.

Thieving of automobiles, as is well known, is quite prevalent and automobile thieves are in many instances expert mechanics and can readily "pick" the ordinary lock provided on a motor vehicle for preventing theft, and to prevent such thieving, I have provided a device which is difficult to unlock by one unacquainted therewith and which operates a "combination lock" that is, the operating dial must be set to a certain combination of predetermined positions to cause an unlocking of the device and in order that any attempt to unlock the device by an unauthorized person or one not acquainted with the combination, may be readily apparent, I have provided means by which the horn or audible signal of the motor vehicle will be sounded upon the moving of the operating dial in a direction other than that necessary to release the lock; and the following is a detailed description of one means by which these advantageous results may be accomplished:—

With reference to the drawings, 10 designates the dash board of a motor vehicle through which projects a steering column 11 of the steering wheel 12 and about which adjacent the dash there is mounted my improved locking device 13, which consists of a sleeve 14 adapted to be secured to the column 11.

On the sleeve there is mounted the body 15 of the device in which is slidably mounted a locking member or pin 16 for projecting through an opening 17 in the steering column 11 and entering into one of a plurality of openings 18 in the steering post 19 when in registry with the opening 17 in the column 11 to lock the post against rotation relative to the column and thus prevent the operation of the steering mechanism.

The pin 16 is loosely mounted on one arm of a bell crank lever 20 and a spring 22 attached to the other arm tends to swing this lever on a pivot 21 intermediate its ends to force the locking pin 16 into said openings.

A plunger 23 is slidably mounted in the body and has a flat portion 24 which engages the end of the bell crank lever 20 to swing the same on its pivot 21 against action of the spring and move the locking pin 16 to released or unlocked position.

The end 25 of the plunger is suitably shaped so that its forms one of the teeth of the rack disc 26 as is clearly illustrated in Figure 5. This rack disc is mounted upon the body 15 by means of leaf springs 27 which enable it to be rotated relatively to the body to a slight extent for the purpose hereinafter described.

About the sleeve 14 and projecting into the body of the device there is a collar 28 which is rotatable relative to the sleeve 14 by means of a handle 29 and on this collar there is carried a dial 30 having characters thereon to indicate the different positions of the dial relative to a fixed point 31 on the dash 10.

The outer end of this collar is provided with a series of teeth 32 for engagement with a corresponding series of teeth 33 on the collar 34 fixed on the sleeve 14 and a spring 35 is provided for moving the sleeve 28 to cause these teeth 32 and 33 to enter, engage and prevent movement of the dial.

On the under side of the dial 30 there is a plate 57 carrying a dog 36 which has a ball end 37 suitably mounted in the socket 38. This dog is of a length greater than the distance between the dial and the rack so that a rotation of the dial in the direction of the arrow in Figure 4 causes this dog to drag over the teeth 39 of the rack while spring 40 assists in holding the dog in engagement with these teeth.

In order to press the plunger 23 inwardly the dog 36 is moved by means of the dial until it engages the end 25 of the plunger at which time the dial is rotated in the opposite direction which forces the dog 36 and plunger inwardly to cause it to assume a position at right angles to the rotative movement of the dial, as illustrated in Figure 3. This inward movement of the plunger 23 swings the bell crank lever on the pivot 21 and withdraws the pin 16 from locked position. It is, of course, understood that the dial is unclutched by inward pressure of the handle 29 to release the teeth 32 and 33 before such rotative movement of the dial may take place.

If a person is not acquainted with the position of the dial necessary for causing the dial to press the plunger inwardly and should attempt by means of reverse rotation to accomplish this result, the dog 36 would engage some tooth 39 which would cause the rack to rotate slightly against the tension of the springs 27, which would cause either one of the contact pins 42 carried by this rack to engage a cooperating contact 43 to complete an electrical circuit through wires 44, battery 45, audible signal or horn 46, and wire 47 to sound the audible signal. This would occur each time the dial is turned when the dog is in a position other than in engagement with the end 25 of the operating plunger.

In order to make the movement of the dial a three-character combination and to make the unlocking of this device less accessible, I have so shaped the end 25 of the operating plunger 23 that it will be pressed inwardly by an engagement of the dog 36, when it is in but one position of inclination, for instance, I have illustrated in Figure 7, the dog 35 as inclined in a direction which by a movement of the dial in the direction of the arrow will not cause the plunger to the pressed inwardly, the shaping of the tooth 25 being such that the dog will slide off and engage the tooth 41 which will move the rack and sound the signal rather than press the plunger inwardly. It is therefore, necessary in order to press this plunger inwardly to have the dog 36 positioned on an incline, as illustrated in dotted lines in Figure 7, in order that the reverse rotation of the dial will cause the dog to assume a position as in Figure 2 and press the plunger inwardly; and in order that the dog may be reversed into this position of inclination, I have provided an auxiliary or dummy plunger 48 having an end 49 forming a cup-shaped tooth in the rack 26, which plunger is pressed outwardly by means of a spring 50. This plunger is of such shape that the dog when in engagement therewith in either position of inclination will press the same inwardly and permit the reversing of rotation of the dial and inclination of the dog.

From the above description it will be seen that by throwing the dial to locked position by a rotation in a direction to incline the dogs that it cannot be operated, in order to release the plunger 23 it will be necessary to rotate the dial to the position in which the dog engages the auxiliary plunger to reverse its inclination and the movement of the dial in order to be able to rotate the dial to a position with the dog in engagement with the actuating plunger to cause it to be moved to an unlocked position.

It will thus be seen that three positions of the dial will be necessary for the completion of unlocking; first, a movement to a character corresponding with the position of the dog 36 in engagement with the auxiliary plunger 48; second, movement by a reverse rotation to a character corresponding to a position of the dog 36 when in engagement with the plunger 23, and third, a movement to a character corresponding to a position in which the dog will become straightened while at right angles to the rotation of the dial, as illustrated in Figure 3, in order that the dog may press the plunger inwardly to released or unlocked position.

In locking the steering mechanism of a motor it is also desirable to lock the ignition mechanism at the same time so that the engine of the automobile cannot be started and the automobile operated when the same can not be guided and to accomplish this I have provided a switch having terminals 51 and 52 in proximity to the movement of the lock pin 16, whereby a movement of the pin 16 to unlocked position closes the contacts 51 and 52 which are held open by the inherent natural spring of the stock to complete the circuit from the battery 45 through wire 53, contacts 51 and 52, wire 54, distributor 55 and wire 56.

It will be readily understood that the combinations of position or character on the dial and rotation to the different positions may be varied by adjusting the dial plate 30 relative to the carrying plate 57 or a different rack may be provided with openings 59 or plungers at different points in the rack to provide a different set of combinations or positions for the release of the locking movement. A further variation might be accomplished by the providing of a dog of different lengths, and various other ways might readily be provided as will occur to the skilled mechanic to multiply the different combinations for different locks built in accordance with the structure here illustrated.

It will also be apparent that to stop the engine of a motor vehicle the device must be placed in such position as to not only lock the ignition but also lock the steering post, it being understood that should the openings 18 not register with the openings 17 at the time the lock is applied these openings may be made to register by moving the steering post at which time the wheel would be instantly locked and the ignition would also be disconnected and the engine stopped and locked.

It will thus be seen that I have provided a lock to prevent the steering of motor vehicles and at the same time lock the ignition and provide a means by which the audible signal of the device will be operated upon tampering with the locking device by unauthorized persons.

Instead of mounting the locking mechanism on the wheel post, I may set the same to one side thereof as at 60, see Figure 10 and support the device on the dash or instrument board 61, in which case the body of the lock is connected to the post 11 by a clamp bracket 62 through which the lock bolt 63 is operated by the lock mechanism above described, to engage the wheel shaft 11 and lock the same in the desired position.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a motor vehicle, a steering column, a steering post in said column, a member for locking said post against rotation relative to said column, resilient means tending to move said member to locked position, a rotatable dial, and means responsive to the movement of said dial to predetermined positions by a rotative movement thereof in opposite directions to cause withdrawal of said member from locking position against the action of said resilient means.

2. In a motor vehicle, a steering column, a steering post in said column, a member for locking said post against rotation relative to said column, spring means for pressing said member to locked position, a plunger for withdrawing said member against said spring means, a rotatable dial, and a dog operated by the rotation of said dial for causing said plunger to unlock said member.

3. In a motor vehicle, a steering column, a steering post in said column, a member for locking said post against rotation relative to said column, spring means for pressing said member to locked position, a plunger for withdrawing said member against said spring means, a rotatable dial, a dog operated by the rotation of said dial for causing said plunger to unlock said member, and means for locking said dial in set position.

4. In a motor vehicle, a steering column and a steering post in said column, each having an opening therein, said opening registering in certain relative positions of rotation, a pin for entering said openings to lock the post against rotation relative to said column, spring means for moving said pin to locked position against said spring pressure, a toothed rack, said plunger having one end forming a tooth of said rack, a rotatable dial, a dog carried by said dial of a length greater than the distance between said dial and rack to be dragged over the teeth of said rack by the rotation of said dial, said dog being operable by a reverse rotative movement of said dial when in engagement with said plunger tooth to press said plunger and unlock said post.

5. In a motor vehicle, a steering column and a steering post in said column, each having an opening therein, said opening registering in certain relative positions of rotation, a pin for entering said openings to lock the post against rotation relative to said column, spring means for moving said pin to locked position, a plunger for withdrawing said pin from locked position against said spring pressure, a toothed rack, a dog for operating said plunger, said plunger having one end forming a tooth in said rack and shaped to be depressed by a movement of the dog in but one direction, an auxiliary plunger having one end shaped to form a tooth in said rack and depressible by said dog to permit the reversing of said dog and dial, said dog being carried by said dial and of a length greater than the distance between said dial and rack to be dragged over the teeth of said rack by the rotation of said dial, said dog being operable by a reverse rotative movement of said dial when in engagement with said plunger tooth to press said plunger and unlock said post.

6. In a motor vehicle, an ignition circuit, a switch in said circuit, a steering column, a steering post in said column, a member for closing said switch in one position and for locking said post against rotation relative to said column and at the same time permitting said switch to open in another position of its movement, a dial, and means operated by the manual manipulation of said dial for moving said member.

7. In a motor vehicle, an ignition circuit, a switch in said circuit, a steering column, a steering post in said column, a slidable member for closing said switch when at one end of its stroke and for locking said post against rotation relative to said column and at the same time permitting said switch to open when at the opposite end of its stroke, a rotatable dial, and means responsive to the movement of said dial to predetermined positions by a rotative movement thereof, in opposite directions for withdrawing said member from locking position.

In testimony whereof I affix my signature.

ALBERT SAVOY.